3,059,235
IMPACT RECORDER

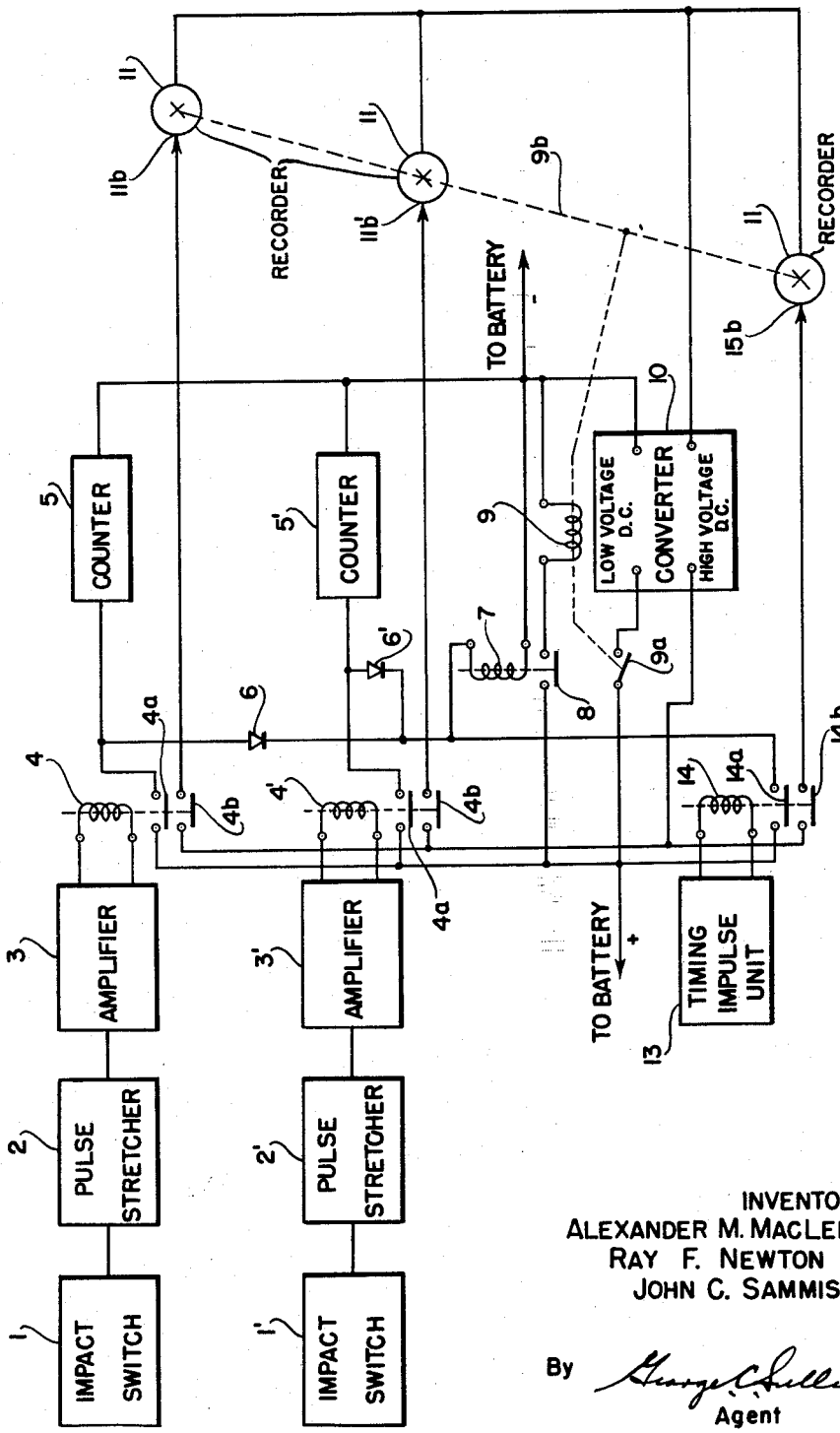

John C. Sammis, West Covina, Ray Frederick Newton, Menlo Park, and Alexander Morrison MacLennan, Palo Alto, Calif., assignors to Lockheed Aircraft Corporation, Burbank, Calif.
Filed Mar. 7, 1960, Ser. No. 13,060
7 Claims. (Cl. 346—7)

This invention relates to an impact recorder, and more particularly to a recorder wherein a single or plurality of events may be recorded on an intermittently driven chart having a time base thereon.

In the fields of aviation, missiles, transportation, and the like, it is frequently desired to record crash or impact data against a time reference. Presently known recorders have a continuous drive wherein the recording chart is running at all times. This necessitates a large supply of paper which, in many instances, is not only bulky, but expensive and inconvenient to handle. Furthermore, in an impact recorder, a continuous drive chart has the disadvantage that during the interval of inspection, there may be no impact or crash, resulting in a large quantity of effectively wasted paper. For this reason, it is desirable to have a recorder start and stop in response to the happening of an event or impact. It is further desirable to provide timing marks on the chart to indicate the time in which the event to be recorded happened.

The above deficiencies and disadvantages are eliminated by the present invention wherein an impact sensitive means, such as an accelerometer switch, produces an impulse upon the happening of an event. The impulse is widened and applied to an amplifier relay which has two pairs of normally open contacts. One pair of the contacts operates a solenoid type drive circuit, which advances the recorder chart paper a predetermined increment. The other pair of contacts establish a ready condition for the marking stylus and at the end of the increment of chart advance a mark is produced on the paper. The impact data is correlated with a time reference to indicate approximately the time of occurrence of the impact.

An object of this invention is to provide a recorder in which a plurality of events may be recorded either concurrently or consecutively.

A further object of this invention is to provide an intermittent drive recorder in which information from a plurality of sources may be recorded against a suitable time base.

A further object of this invention is to provide an intermittent drive recorder in which the number of impulses from the events or impacts are indicated and recorded.

The above and related objects are made apparent by the following description and drawing of an illustrative embodiment of the invention, in which the single FIGURE shows schematically the recording system of this invention.

Referring to the drawing, a plurality of channels (two of which are shown) each including an impact sensitive device, actuate a recording mechanism, simultaneously or consecutively to indicate the event by conventional recording techniques on a paper chart or graph.

Channels 1 and 2 are similar as indicated by the primed reference characters in channel 2. The details of the channel circuits are conventional and well known. For this reason and to simplify the drawings and description, the invention will be described as a system, in which the obvious details are omitted.

The impact switch 1 of channel 1 may comprise an accelerometer, such as described in United States Letters Patent 2,311,637, granted February 23, 1943, or other impact sensitive means which is used to actuate a switch in an electrical circuit. For convenience, all of the impact switches of the various channels may be incorporated in one unit and placed at the site where the impact is to be measured and connected to the recorder unit proper at a remote point by means of a suitable cable. The individual accelerometers are preferably calibrated in terms of multiples of the known "G" force, i.e., forces which are equal to or a multiple of the gravitational force. Closure of the impact switch in response to shock or impact generates an electrical impulse, which is applied to the pulse stretcher 2. The pulse stretcher may comprise a single RC network which is charged by the applied impulse and providing a widened pulse by slow discharge.

The widened pulse is applied to relay amplifier 3 which amplifies the pulse and applies it to relay 4. Contacts 4a and 4b are normally open, and when the relay is energized said contacts are both closed. Closure of contacts 4a energizes the counter or impact totalizer 5 from a suitable power supply and simultaneously energizes relay 7 by way of the rectifier switch 6. Normally open contact 8 of relay 7, closes and energizes the solenoid coil 9.

When coil 9 is energized, the armature represented by the dotted line 9b advances the recorder 11 a predetermined increment. The solenoid 9 and drive 9b may comprise a well known solenoid operated ratchet mechanism or equivalent. Switch 9a is closed at the end of or during the armature travel so that the stylus records separate rather than overlapping lines. Switch 9a may be a microswitch which is arranged to be actuated by the solenoid armature. Closure of switch 9a applies voltage to the low voltage D.C. to high voltage D.C. converter 10. Since the contacts 4b on relay 4 are already closed, the output of converter 10 causes an electrical impulse at the recording stylus 11b, providing a mark on the recorder chart in a conventional manner. Instead of the converter 10, a D.C. to A.C. inverter may be used.

The foregoing description, as applied to channel 1, is also applicable to channel 2 and other channels which may be added as desired. In other words, the number of impact switches is usually determined by the range and coverage of impact data desired to be determined. The lower limit may be determined by the least impact which will cause damage to equipment or instrumentation in the area under observation, while the upper limit may be selected in any desired manner. The spread, that is, the number of impact sensitive devices covering the range from low to high limit, will be determined by the number of channels available, and the accuracy desired.

It is to be noted that each channel is provided with a separate counter or totalizer 5 and stylus 11b. Also relay contacts 4a, 4b are provided for each channel to eliminate interference between channels, and to assure that the recorder operates only for those channels that have been actuated in response to an impact of a certain magnitude. The diode switch 6 prevents signals from one channel operating the counter of another channel.

While a solenoid drive has been illustrated, it is understood that the recorder may be driven by any intermittent type drive. Furthermore the recording method may be chosen as desired, the limiting factor of course being that it be permanent and relatively insensitive to shock. While shock proof mountings may eliminate most of the sudden and sharp destructive impacts, inertia forces are ever-present in rapid acceleration or deceleration periods.

The timing impulse unit 13 preferably comprises a conventional clock-work mechanism and impulse generator for operation relay 14 and the related contacts. Closure of relay contacts 14a energizes relay 7 to operate the recorder drive as above described. Relay contacts 14b complete the A.C. circuit to the recording stylus 15 whereby discrete timing impulses are placed on the chart paper preferably along one edge thereof. While the timing interval of the timing impulse unit may be selected as desired, in order to appreciate the advantages of the intermittent drive, the interval should not be selected so short as to effectively have a continuous drive. On the other hand, an interval which is of a considerable duration gives little or no reliable information. A preferred time interval may be roughly from about two minutes to ten or fifteen minutes. Thus at every two minute interval, the timing unit will actuate the recorder to thereby mark along the edge a known time interval. By correlating the recorded data from the various accelerometer channels, both the magnitude of the impact or crash and the time of occurrence may be noted.

From the above description, it is apparent that each channel, including the timing reference generator, which has relay contacts 4b closed at the time converter 10 is energized, produces a mark on the chart paper.

While a specific embodiment of the invention has been shown and described, it should be understood that certain alterations, modifications and substitutions may be made to the instant disclosure without departing from the spirit and scope of the invention as defined by the appended claims.

What is claimed is:

1. An impact recorder comprising impact sensitive means having a threshold response of a pre-determined "G"-unit for generating an electrical impulse when said threshold is exceeded, means for increasing the width of said impulse, means for amplifying said wide pulse, a first relay connected to said amplifier means, a first pair of contacts on said first relay, an impact totalizer energized by said first contacts, a second relay connected to said first pair of contacts, a second pair of contacts on said first relay, a stylus marking circuit energized by said second pair of contacts, a recorder including a surface on which data is to be recorded, a solenoid drive circuit operable by said second relay to advance said recorder a pre-determined increment, means for generating a marking current to said stylus, and means actuated by said solenoid drive for operating said generating means at approximately the end of said increment.

2. The combination as recited in claim 1, and including a timing impulse generator for providing a time reference on said recording surface.

3. In a recorder having a recording surface and a plurality of styli for producing indications on said surface, a plurality of impact switches each responsive to a different "G" magnitude for producing an electrical impulse whenever said "G" magnitude is exceeded, means including a pulse stretcher for advancing the recorder a pre-determined increment in response to said impulse, means for applying an electrical current to one or more of said styli at the end of said pre-determined increment and means for applying timing marks to one of said styli.

4. In an impact recorder having a recording medium and a plurality of styli for marking on said medium, the combination comprising, a plurality of channels each including an impact sensitive pulse generating means, means for increasing the duration of said pulse, a relay responsive to said pulse and having two pair of normally open contacts, means responsive to the closure of one pair of said contacts for advancing said recorder a pre-determined increment, means responsive to said advancing means and to said other pair of contacts for applying a marking voltage to said styli, and a timing impulse means connected to said advancing means for providing a timing reference on said recording medium.

5. In a recorder, means responsive to a predetermined impact threshold for generating an electrical impulse, a recorder drive means, means responsive to said impulse for energizing said drive means, said drive means advancing the recorder a predetermined increment, means responsive to said drive means and said impulse for generating a marking voltage, a recording medium which is advanced by said drive means, and means for applying said marking voltage to said medium.

6. The recorder as defined in claim 5, which includes timing means for applying a timing reference to said recording medium.

7. A recorder for recording impact data or the like on a predetermined time basis, a recording surface, drive means for moving said recording surface, a timing impulse generator for providing a periodic impulse at a predetermined rate, impact sensitive means responsive to impact forces exceeding a preset "G" unit for providing an electrical impulse, means including a relay having normally open contacts for energizing said drive means only in response to either of said impulses, marking means actuated by said drive means for generating a marking voltage, and means for applying said marking voltage to said recording surface, to thereby provide a separate mark for each impulse.

References Cited in the file of this patent
UNITED STATES PATENTS

| | | |
|---|---|---|
| 2,517,316 | Holmes | Aug. 1, 1950 |
| 2,748,487 | Zimmermann | June 5, 1956 |